(12) United States Patent
Stapleton

(10) Patent No.: US 11,548,416 B2
(45) Date of Patent: Jan. 10, 2023

(54) LINEAR RECLINER MECHANISM FOR A VEHICLE SEAT

(71) Applicant: Brose Fahrzeugteile SE & Co. Kommanditgesellschaft, Coburg, Coburg (DE)

(72) Inventor: Dakota Stapleton, Flushing, MI (US)

(73) Assignee: Brose Fahrzeugteile SE & Co. Kommanditgesellschaft, Coburg, Coburg (DE)

( * ) Notice: Subject to any disclaimer, the term of this patent is extended or adjusted under 35 U.S.C. 154(b) by 0 days.

(21) Appl. No.: 17/218,622

(22) Filed: Mar. 31, 2021

(65) Prior Publication Data

US 2022/0314844 A1 Oct. 6, 2022

(51) Int. Cl.
*B60N 2/23* (2006.01)
*B60N 2/68* (2006.01)
*B60N 2/02* (2006.01)

(52) U.S. Cl.
CPC .......... *B60N 2/233* (2013.01); *B60N 2/0224* (2013.01); *B60N 2/686* (2013.01)

(58) Field of Classification Search
CPC ........ B60N 2/233; B60N 2/23; B60N 2/0224; B60N 2/686; B60N 2/206
See application file for complete search history.

(56) References Cited

U.S. PATENT DOCUMENTS

| | | | | |
|---|---|---|---|---|
| 5,203,608 A | * | 4/1993 | Tame | B60N 2/233 297/320 |
| 5,318,341 A | * | 6/1994 | Griswold | B60N 2/66 297/483 |
| 5,393,123 A | * | 2/1995 | Hernandez | B60N 2/232 297/378.12 |
| 5,868,470 A | * | 2/1999 | Hyder | B60N 2/233 297/362.14 |
| 6,520,582 B2 | | 2/2003 | Glance | |
| 6,726,282 B2 | * | 4/2004 | Gray | B60N 2/232 297/378.12 |
| 9,145,071 B2 | | 9/2015 | Böhm et al. | |
| 10,442,322 B2 | * | 10/2019 | Handigol | B60N 2/165 |

FOREIGN PATENT DOCUMENTS

EP 0704338 A1 4/1996
GB 2106172 A 4/1983

* cited by examiner

*Primary Examiner* — Milton Nelson, Jr.
(74) *Attorney, Agent, or Firm* — Brooks Kushman, P.C.

(57) ABSTRACT

A vehicle seat including a pivot bracket, a back frame, a linear adjustment mechanism, a striker, and a latch. The back frame is pivotally connected to the pivot bracket and configured to pivot about a pivot axis. The back frame includes a first end spaced apart from the and disposed below the pivot axis. The latch is configured to selectively attach the linear adjustment mechanism to the first end of the back frame so that as the first linear adjustment mechanism translates, the back frame pivots from a first use position and a second use position, and selectively detach the linear adjustment mechanism from the first end of the back frame so that the back frame is pivotable to a non-use position.

18 Claims, 5 Drawing Sheets

LINEAR RECLINER MECHANISM FOR A VEHICLE SEAT

TECHNICAL FIELD

The present disclosure relates to a vehicle seat such as a vehicle seat for use in a second or third row in a vehicle.

BACKGROUND

Vehicles such as sport utility vehicles may include second and third row seats that are configured to support an occupant when in use and move to a non-use position to provide additional space in the vehicle cabin. Second and third row seats may include a cushion support and a back frame that may be configured to pivot with respect to the cushion carrier. Second and third row seats may also include tracks or rails that allow longitudinal adjustment of the cushion carrier.

SUMMARY

According to one embodiment, a vehicle seat for use in a vehicle including a vehicle floor is provided. The vehicle seat may include a pivot bracket, a back frame, a linear adjustment mechanism, a striker, and a latch. The pivot bracket may be coupled to the vehicle floor and the back frame may be pivotally connected to the pivot bracket and configured to pivot about a pivot axis between a first use position, a second use position, and a non-use position. The linear adjustment mechanism may be coupled to the back frame and configured to translate between a first position and a second position to move the back frame between the first use position to the second use position. The striker may be fixed to either the back frame or the linear adjustment mechanism and the latch is fixed to the other of the back frame or the linear adjustment device. The latch may be configured to change between an unlocked state, in which the pivotable from either the first use position or the second use position to the non-use position, and a locked state in which the latch engages the striker so that the back frame is pivotable between the first use position and the second use position.

According to another embodiment, a vehicle seat for use in a vehicle is provided. The vehicle seat may include a pivot bracket, a back frame, a linear adjustment mechanism, a striker, and a latch. The back frame may be pivotally connected to the pivot bracket and configured to pivot about a pivot axis. The back frame may include a first end spaced apart from the and disposed below the pivot axis. The latch may be configured to selectively attach the linear adjustment mechanism to the first end of the back frame so that as the first linear adjustment mechanism translates, the back frame pivots from a first use position and a second use position, and selectively detach the linear adjustment mechanism from the first end of the back frame so that the back frame is pivotable to a non-use position.

According to yet another embodiment, a vehicle seat for use in a vehicle is provided. The vehicle seat may include a fixed rail, a translatable rail, a cushion carrier, a pivot bracket, a linear adjustment mechanism, a striker, and a latch. The fixed rail may be configured to be coupled to a floor of the vehicle. The translatable rail may be configured to move along the fixed rail and the cushion carrier may be coupled to the translatable rail. The pivot bracket may be fixed to either the translatable rail or the floor. The back frame may be pivotally connected to the pivot bracket and configured to pivot about a pivot axis between a first use position, a second use position, and a non-use position and the first linear adjustment mechanism may be fixed to the translatable rail. The latch may be configured to selectively attach the linear adjustment mechanism to the first end of the back frame so that as the first linear adjustment mechanism translates, the back frame pivots from a first use position and a second use position, and selectively detach the linear adjustment mechanism from the first end of the back frame so that the back frame is pivotable to a non-use position.

DETAILED DESCRIPTION

Figure 1:
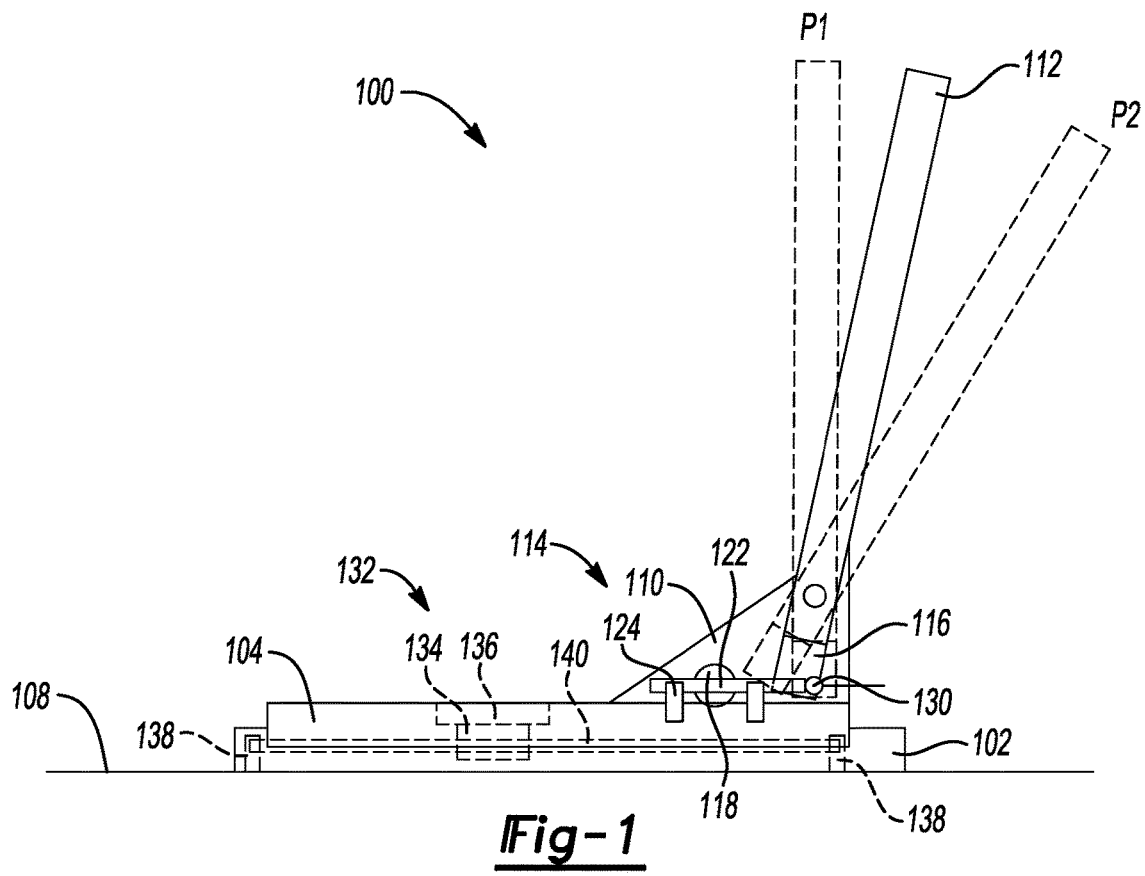
FIG. 1 illustrates a schematic diagram of an exemplary vehicle seat.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Vehicle seats may include a cushion carrier and a back frame to support a seated occupant. The back frame may be coupled to the cushion carrier by a recliner mechanism or fitting that may be actuated so that the back frame may be pivoted to one or more use positions as desired by the occupant. The recliner mechanism or the back frame may be configured to rotate to a non-use position, such as a fold-flat position, so that additional room is provided in the vehicle cabin. Recliner mechanisms and corresponding attachment brackets may extend in a cross-car direction and form the widest portion of the vehicle seat.

Under certain circumstances, the width of the seat may be constrained or limited. For example, the portions of the vehicle body, such as wheel wells or sidewalls of the vehicle may not allow installation of a vehicle seat provided with a recliner mechanism and fold-flat mechanism. Moreover, recliner mechanisms are generally complicated and expensive to manufacture. Accordingly, providing a vehicle seat with an adjustable back frame and fold-flat functionality without a recliner mechanism may provide a number of advantages.

Figure 4:
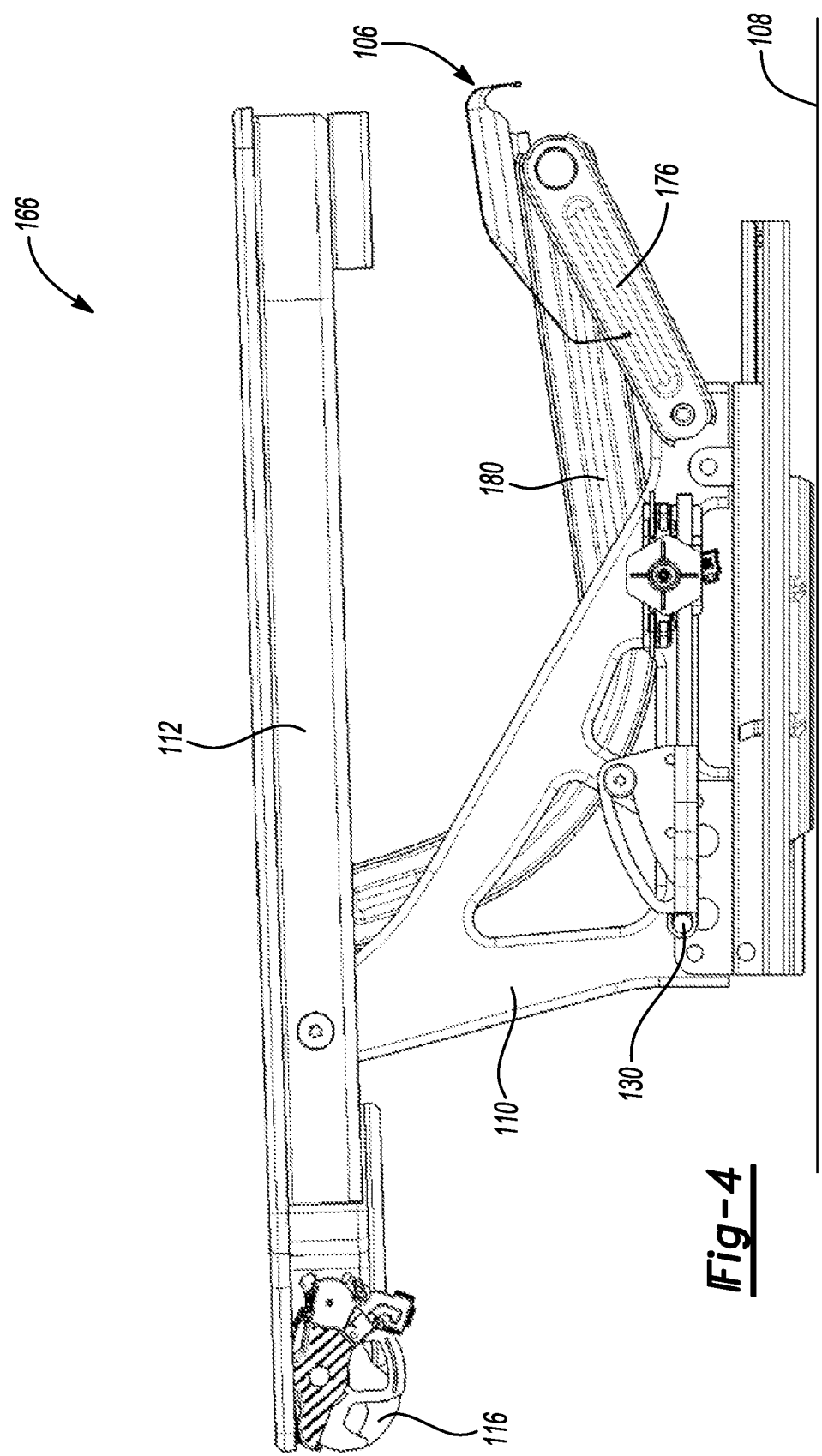
FIG. 4 illustrates a plan view of an exemplary vehicle seat including a back frame in a non-use position.

Referring generally to the figures, a vehicle seat 100 is provided. The vehicle seat 100 may include a fixed rail 102, a translatable rail 104, and a cushion carrier 106. The translatable rail 104 may be configured to move along the fixed rail 102 to adjust a longitudinal position of the vehicle seat 100 with respect to the vehicle floor 108 and the cushion carrier 106 may be adjusted in one or more directions with respect to the translatable rail 104. The vehicle seat 100 may include a pivot bracket 110 that may be fixed to either the fixed rail 102, the translatable rail 104, or the floor 108 and a back frame 112 may be pivotally connected to the pivot bracket 110. The back frame 112 may be configured to pivot about a pivot axis A between a first use position P1, a second use position P2, and a non-use position (FIG. 4).

A linear adjustment mechanism 114 may be fixed to the translatable rail 104 and a latch 116 may be provided to selectively attach the linear adjustment mechanism, such as a recliner linear adjustment mechanism 114 to the back frame 112. As the recliner linear adjustment mechanism 114 translates, the back frame 112 pivots between the first use position P1 and the second use position P2. The latch 116 may be configured to selectively detach from the recliner linear adjustment mechanism 114 so that the back frame 112 is pivotable to a non-use position. As an example, when the back frame 112 is in the non-use position, the back frame 112 may be positioned parallel to the cushion carrier 106.

The recliner linear adjustment mechanism 114 may include a first gearbox 118 that may be attached to either the fixed rail 102 or the translatable rail 104 by a gearbox attachment bracket 120. Alternatively, the gearbox attachment bracket 120 may fix the first gearbox 118 to the floor 108. The recliner linear adjustment mechanism 114 may include a first spindle 122 and a first attachment member, such as a spindle attachment bracket 124 that may extend between the first spindle 122 and the latch 116. The pivot bracket 110 may include a first side 126 and a second side 128 and as an example, the back frame 112 and the first spindle 122 may each be disposed on the first side 126 of the pivot bracket 110. In one or more embodiments, a striker 130 may be attached the spindle attachment bracket 124 or the back frame 112 and the latch 116 may be configured to selectively engage or attach to the striker 130.

In one or more embodiments, a rail linear adjustment mechanism 132 may be provided to translate the translatable rail 104 with respect to the fixed rail 102. The rail linear adjustment mechanism 132 may be configured to adjust the longitudinal or fore-aft position of the cushion carrier 106, or the back frame 112, or both. The rail linear adjustment mechanism 132 may include a second gearbox 134, a second spindle 140 operatively coupled to the second gearbox 134, and a second gearbox attachment bracket 136 that may attach the second gearbox 134 to the fixed rail 102 or the translatable rail 104. The second spindle 140 may be supported by a second attachment bracket 138 that may be operatively coupled one of the rails 102, 104, so that as the second spindle 140 rotates or as the second gearbox 134 actuates, the translatable rail 104 translates along the fixed rail 102.

According to another embodiment, the vehicle seat 100 may include a rack and pinion mechanism 142 that may be configured to adjust the back frame 112. The rack and pinion mechanism 142 may include an elongated rack 144 and a pinion drive 146. The pinion drive 146 may include a pinion gear 148 and the elongated rack 144 may be coupled to the vehicle floor 108 and the back frame 112. The pinion gear 148 may be configured to engage the elongated rack 144 so that as the pinion gear 148 rotates in a first rotational direction R1, the elongated rack 144 translates towards the back frame 112 and as the pinion gear 148 rotates in a second rotational direction R2, the elongated rack 144 translates away from the back frame 112. As an example, the elongated rack 144 may be attached to the either the fixed rail 102 or the translatable 104 so that the elongated rack 144 may translate with respect to the fixed rail 102 or the translatable 104.

The elongated rack 144 may be attached to the striker 130 or the elongated rack 144 may carry the latch 116. If the elongated rack 144 carries the latch 116, the elongated rack 144 may be fixed to or extend into a housing 150 of the latch 116. As an example, the elongated rack 144 may be supported by one or more attachment brackets 152 that may extend from the pivot bracket 110, the fixed rail 102, or the translatable rail 104. The elongated rack 144 may translate along the attachment bracket 152 within a slot or groove (not shown) to prevent the elongated rack 144 from moving in a transverse direction Y.

The back frame 112 may include a number of side members 156 that may each be pivotally attached to the pivot bracket 110 by a shaft 160 at the pivot axis A. A cross member 158 may extend between the side members 156 and a portion of the cross member 158 may be positioned coaxially with respect to the pivot axis A. As an example, the shaft 160 may be shoulder bolt 162 that may include a threaded portion and a shoulder. The threaded portion may be threaded to the back frame 112 and the shoulder may rotate within an aperture defined by the pivot bracket 110.

FIG. 1 illustrates a schematic diagram of the vehicle seat 100. The vehicle seat 100 includes the fixed rail 102 and the translatable rail 104 that is configured to move along the fixed rail 102. The pivot bracket 110 may be attached to the translatable rail 104 by one or more welds that may be formed by laser or MIG welding. Alternatively, the pivot bracket 110 may be attached to the translatable rail 104 by one or more fasteners such as rivets or screws. As another example, the pivot bracket 110 may be attached to the floor 108.

The translatable rail 104 may be carried by the second gearbox 134 that may be attached to the translatable rail 104 by the second gearbox attachment bracket 136. In one or more embodiments, the second gearbox attachment bracket 136 may be attached to the fixed rail 102. The second spindle 140 may extend through and be operatively coupled to the second gearbox 134 so that as the second spindle 140 or the second gearbox 134 rotates, the translatable rail 104 translates along the fixed rail 102. The second spindle 140 may be supported by the second attachment bracket 138 that may be fixed to the fixed rail 102.

The back frame 112 may be pivotally attached to the pivot bracket 110 by the shaft 160 of by a shoulder bolt 162 (FIG. 7) so that the back frame is pivotable between a first use position P1 and the second use position P2. The latch 116 may be attached to an end portion of the back frame 112 or to the recliner linear adjustment mechanism 114. And the striker 130 may be attached to the other of the recliner linear adjustment mechanism 114 or the back frame 112. The recliner linear adjustment mechanism 114 may include the first spindle 122 that may be supported by the spindle attachment bracket 124. The first spindle 122 may be actuated, such as translated by the first gearbox 118 so that the back frame 112 moves between the first use position P1 and the second use position P2.

Figure 2:
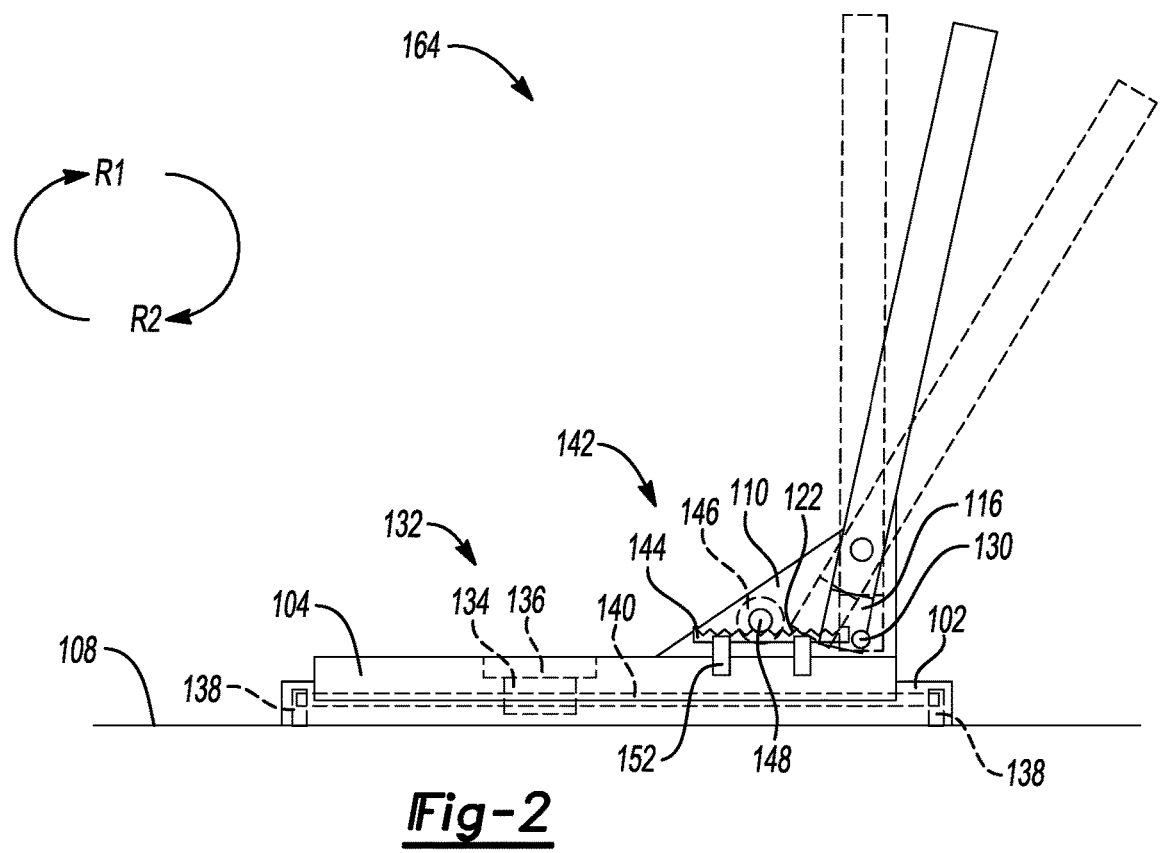
FIG. 2 illustrates a schematic diagram of another exemplary vehicle seat.

FIG. 2 illustrates a schematic diagram of another exemplary vehicle seat 164. As indicated by the reference numbers, vehicle seat 164 may include substantially similar, identical, and/or analogous elements to those of FIGS. 1-7, as indicated by common reference numbers. The vehicle seat includes the rack and pinion mechanism 142 that may be provided with the elongated rack 144 that may be supported by the attachment bracket 152. As described above, the pinion drive 146 may be attached to or supported by the pivot bracket 110 so that the pinion gear 148 engages one or more teeth of the elongated rack 144.

Figure 3:
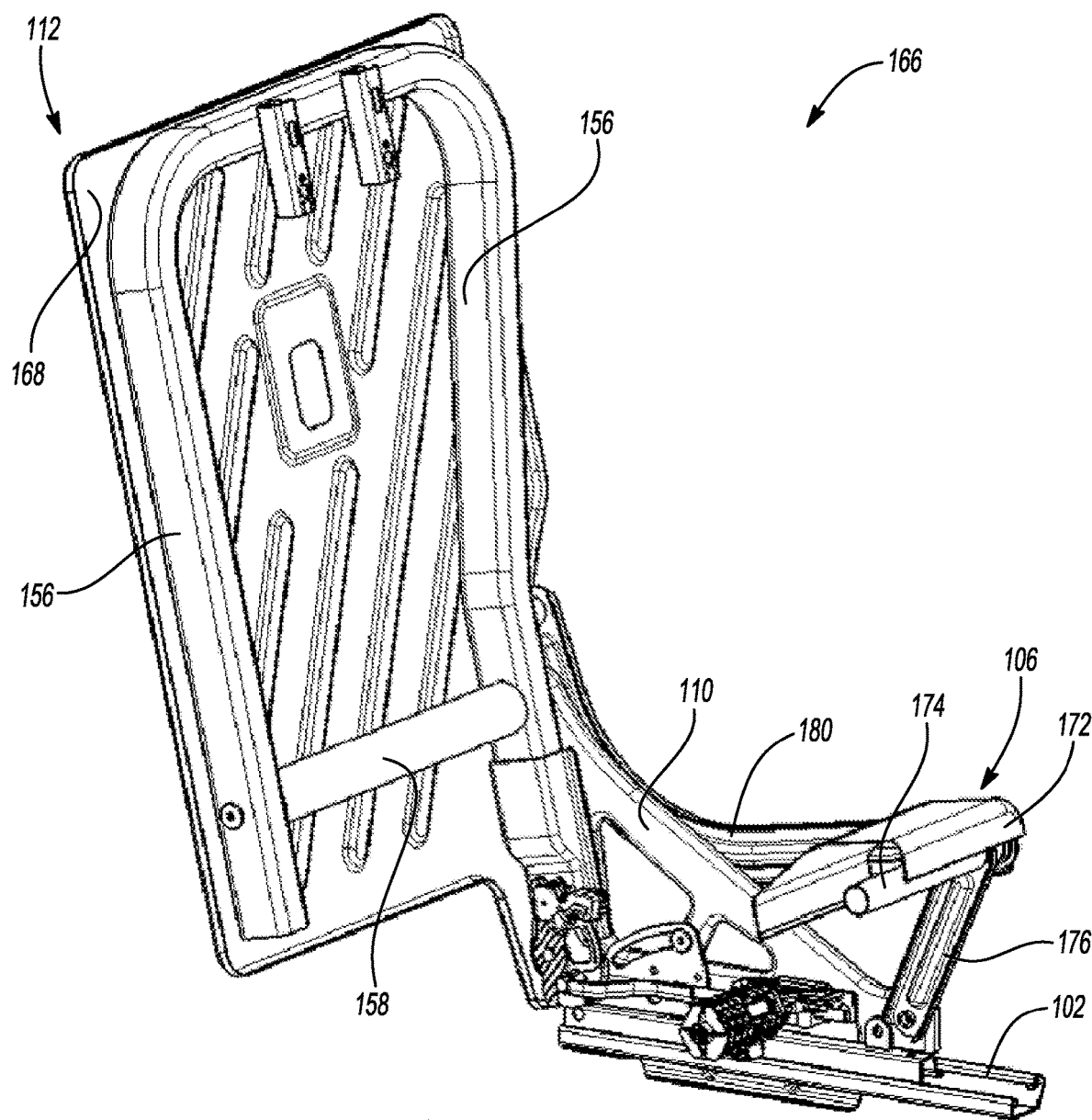
FIG. 3 illustrates a perspective view of a portion of an exemplary vehicle seat.

FIG. 3 illustrates a perspective view of a portion of an exemplary vehicle seat 166. As indicated by the reference numbers, vehicle seat 166 may include substantially similar, identical, and/or analogous elements to those of FIGS. 1-7, as indicated by common reference numbers. The vehicle seat 166, illustrated in FIG. 3, and the vehicle seats 100, 164 illustrated in FIGS. 1-2, respectively, include two sets of rail assemblies that include the fixed rail 102, translatable rail 104, and pivot bracket 110. For the purpose of clarity, portions of the cushion carrier 106 are not illustrated and only one rail assembly of the two rail assemblies are illustrated.

The back frame 112 may include a back panel 168 that may be attached to, such as welded or fastened to the side members 156. The cross member 158 may be a cylindrical tube that extends between the side member 156. A coupling bracket 170 may be attached to one or both of the cross members and the latch 116 or the striker 130 may be fixed to the coupling bracket 170. The back frame 112 may be pivotally attached to the pivot bracket 110 and a transmission member 180 may extend between the pivot bracket 110 and the cushion carrier 106.

The cushion carrier 106 may include a cushion pan 172 that may be supported by a cushion support tube 174. The cushion support tube 174, the cushion pan 172, or both may be pivotally attached to a pivot arm 176. The pivot arm 176 may be pivotally fixed to the pivot bracket 110, the fixed rail 102, the translatable rail 104, or another bracket, or some combination thereof. As the back frame 112 is adjusted, the transmission member 180 may apply a force to the pivot arm 176 so that the pivot arm 176 and the cushion pan 172 pivot toward the fixed rail 102.

FIG. 4 illustrates a plan view of the exemplary vehicle seat 166 including the back frame 112 in the non-use position. The back frame 112 may move from a number of use positions to the non-use position in response to the latch 116 disengaging the striker 130. As an example, when the back frame 112 moves to the non-use position, the pivot arm 176 and cushion pan 172 may move in the longitudinal director or x direction. As an example, the back frame 112 may extend in a direction that may be substantially parallel to the cushion carrier 106 or the vehicle floor 108.

Figure 5:
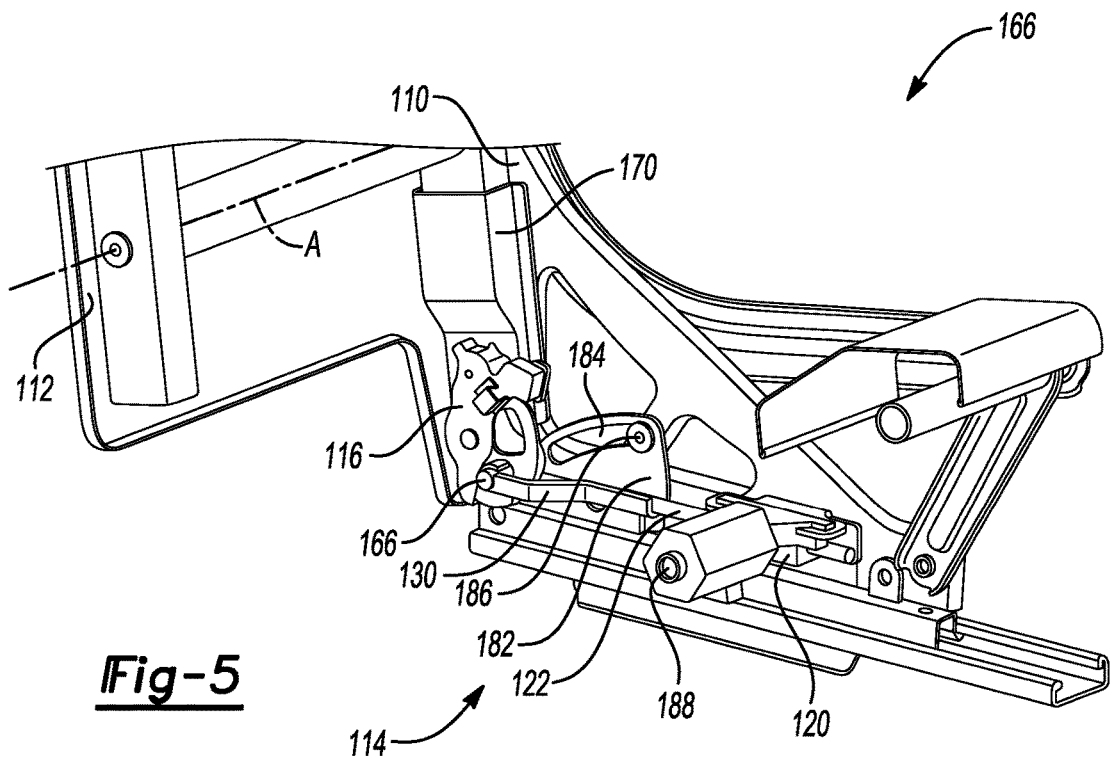
FIG. 5 illustrates a partial perspective view of the vehicle seat illustrated in FIG. 3 in a first position.

FIG. 5 illustrates a partial perspective view of the vehicle seat 166 illustrated in FIG. 3. The back frame 112 in this figure is shown in a first use position P1 and the spindle 122 is shown in an extended position. As an example, the latch 116 is fixed to the coupling bracket 170 and the latch 116 engages the striker 130 that may extend from the spindle attachment bracket 124. In one or more embodiments, the spindle attachment bracket 124 may be configured to carry the latch 116 or the striker 130. The spindle attachment bracket 124 may include a guide portion 182 that may define a slot 184 that may have an arcuate shape extending from a rear portion of the seat 166 in the x and z directions. An attachment member such as a guide fastener 186 may extend through the slot 184.

The recliner linear adjustment mechanism 114 may include a motor 188 that may include a shaft (not illustrated) configured to rotate about a rotational axis RA to actuate the gearbox 118 (FIG. 1) and translate the spindle 122. As another example, the gearbox 118 may translate along the spindle 122. The motor 188 may be fixed to the gearbox attachment bracket 120, or the pivot bracket 110, or both. As an example, the gearbox attachment bracket 120 may be pivotally connected to the pivot bracket 110 so that as the spindle 122 translates from the extended position (FIG. 5) to the retracted position (FIG. 6), the gearbox attachment bracket 120 pivots with respect to the pivot bracket 110.

Figure 6:
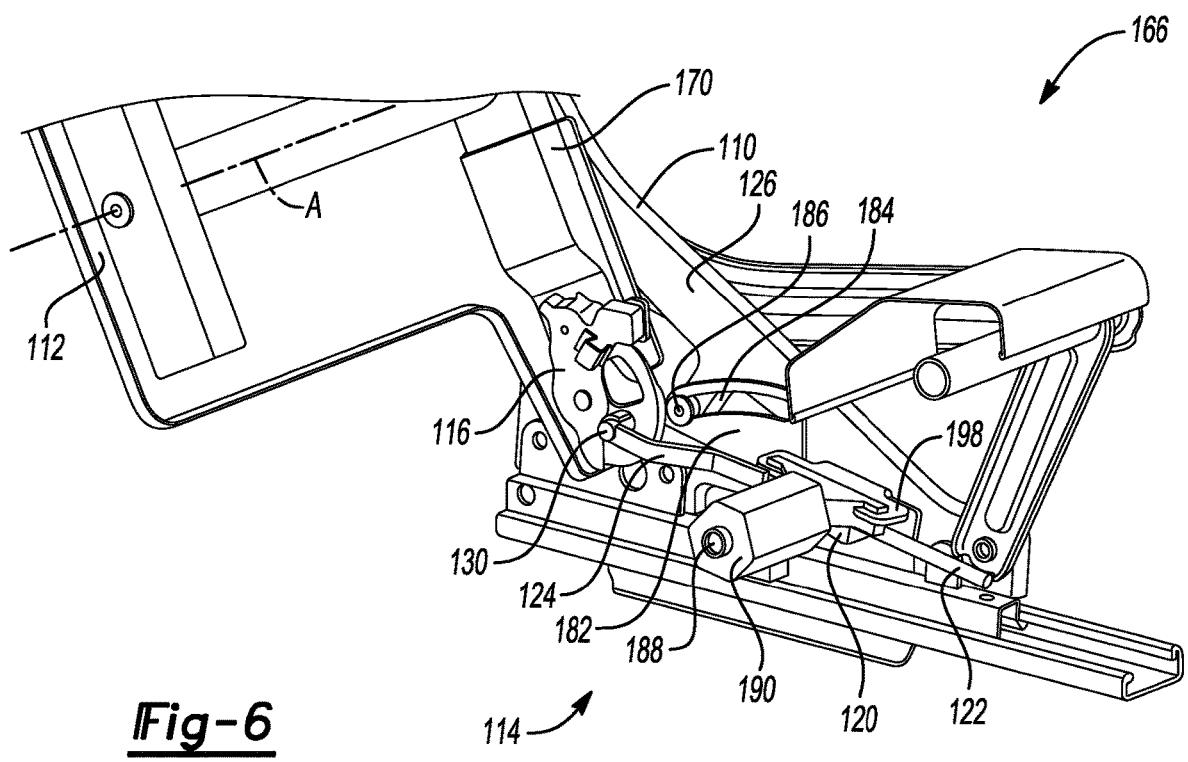
FIG. 6 illustrates a partial perspective view of the vehicle seat illustrated in FIG. 3 in a second position.

FIG. 6 illustrates a partial perspective view of the vehicle seat 166 illustrated in FIG. 3 in the second use position P2 (FIGS. 1 and 2). To move the back frame 112 from the first use position P1 (FIGS. 1, 2 and 5), the spindle 122 may move from the extended position (FIG. 5) to the retracted position so that the spindle attachment bracket 122 moves in one or more directions, such as the X direction and the Z direction. Because the spindle attachment bracket 122 is selectively attached to the latch 116 that may be coupled to the back frame 112, the back frame 112 pivots from the first use position P1 to the second use position P2. As the spindle attachment bracket 122 moves between the extended position to the retracted position, the slot 184 may move along the guide fastener 186 so that the back frame 112 reclines. As an example, the gearbox attachment bracket 120 and the spindle 122 may pivot or rotate towards the fixed rail 102 or floor 108 as the spindle 122 moves from the extended position to the retracted position.

Figure 7:
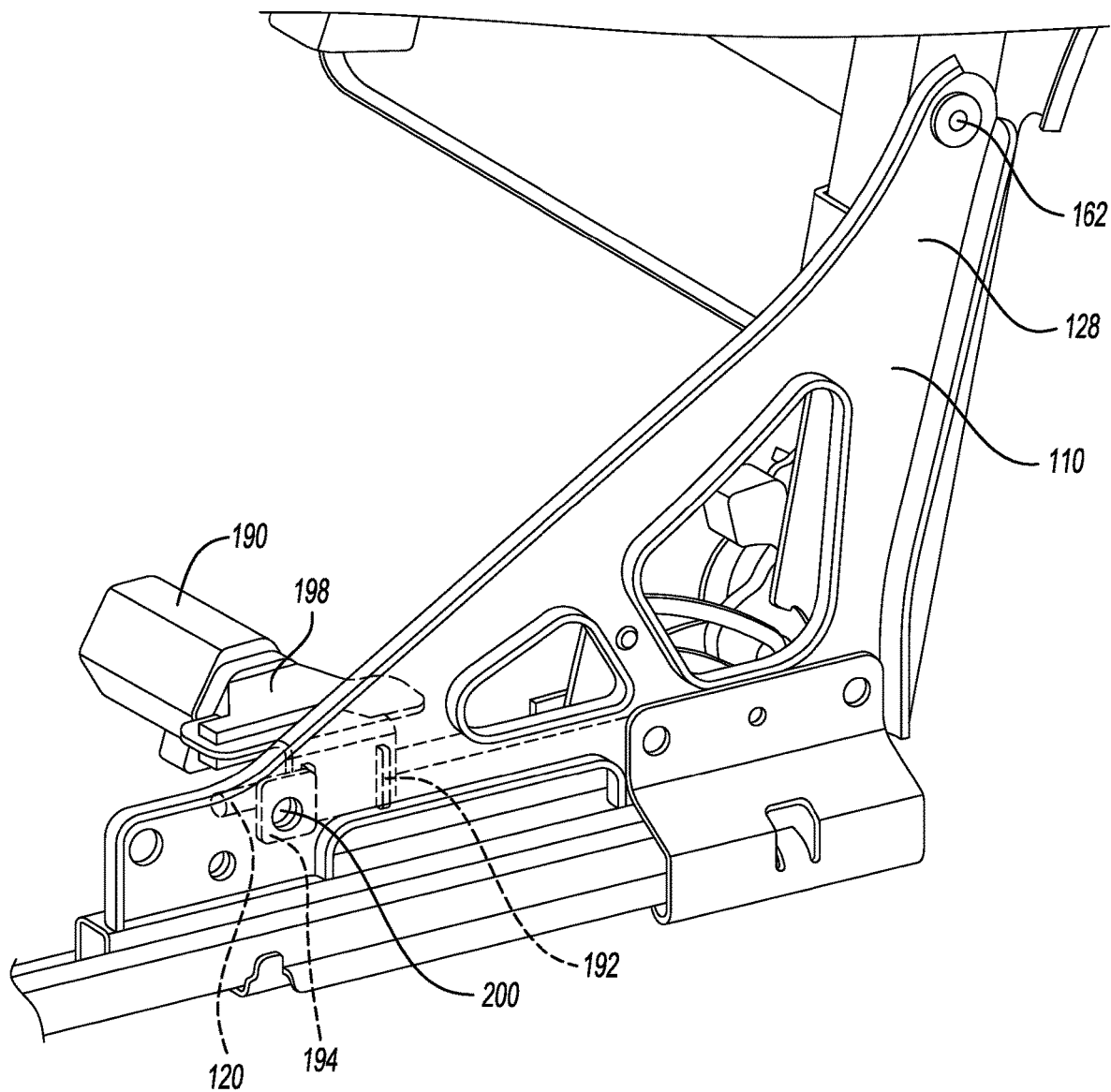
FIG. 7 illustrates a partial perspective view of the vehicle seat illustrated in FIG. 3.

FIG. 7 illustrates a partial perspective view of the vehicle seat illustrated in FIG. 3. For the purpose of clarity, the cushion carrier 106, the opposing rail assembly, and transmission member 180 are not illustrated. The gearbox attachment bracket 120 may include a U-shaped body provided with a first leg 192, a second leg 194, and a medial portion 196 (FIG. 6) that may extend therebetween. As an example, the second leg 194 may be pivotally attached to the pivot bracket 110 at a pivot point 200 so that the gearbox attachment bracket 120 is pivotable about the pivot point 200. The pivot point 200 may be formed by an aperture that may receive a fastener (not illustrated) that is configured to allow rotation or pivoting of the gearbox attachment bracket 120.

In one or more embodiments, the motor 188 may include a motor cover 190 that at least partially enclose the motor 188 (FIGS. 5 and 6). The motor cover 190 or the motor 188 may be attached to a motor attachment bracket 198. The motor attachment bracket 198 may be attached to the gearbox attachment bracket 120. As an example, the motor attachment bracket 198 may include one or more slots that engage the first leg 192 and the second leg 194 of the gearbox attachment bracket 120.

As described above, the back frame 112 may be pivotally connected to the pivot bracket 110 by the shoulder bolt 162. As an example, recliner linear adjustment device 114 may be disposed on the first side 126 (FIG. 6) of the pivot bracket 110 and the shoulder bolt 162 may be inserted from the second side 128 of the pivot bracket 110.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

Parts List
100 vehicle seat
102 fixed rail
104 translatable rail
106 cushion carrier
108 vehicle floor
108 floor
110 pivot bracket
112 back frame
114 recliner linear adjustment mechanism
116 latch
118 first gearbox (recliner)
120 gearbox attachment bracket
122 first spindle (recliner)
124 spindle attachment bracket
126 first side (pivot bracket)
128 second side (pivot bracket)
130 striker
132 rail linear adjustment mechanism 132
134 second gearbox (rail)
136 second gearbox attachment bracket (rail)
138 second attachment bracket (rail)
140 second spindle (rail)
142 rack and pinion mechanism
144 elongated rack
146 pinion drive
148 pinion gear
150 housing (latch)
152 attachment bracket
156 side members
158 cross member
160 shaft
162 shoulder bolt
164 vehicle seat
166 vehicle seat
168 back panel
170 coupling bracket
172 cushion pan
174 cushion support tube
176 pivot arm
180 transmission member
182 guide portion
184 slot
186 guide fastener
188 motor
190 motor cover
192 first leg
194 second leg
196 medial portion
P1 first use position
P2 second use position
A pivot axis
RA rotational axis

What is claimed is:

1. A vehicle seat for use in a vehicle including a vehicle floor, the vehicle seat comprising:
   a pivot bracket configured to be coupled to the vehicle floor;
   a back frame pivotally connected to the pivot bracket and configured to pivot about a pivot axis between a first use position, a second use position, and a non-use position;
   a linear adjustment mechanism coupled to the back frame and configured to translate between a first position and a second position to move the back frame from the first use position and the second use position, wherein the linear adjustment mechanism includes a spindle and a gearbox operatively engaged to the spindle, wherein either the gearbox or the spindle is configured to translate in a longitudinal direction substantially parallel to the vehicle floor to pivot the back frame between the first use position and the second use position;
   a striker fixed to either the back frame or the linear adjustment mechanism; and
   a latch fixed to the other of the back frame or the linear adjustment mechanism, wherein the latch is configured to change between an unlocked state, in which the back frame is pivotable from either the first use position or the second use position to the non-use position, and a locked state in which the latch engages the striker so that the back frame is pivotable between the first use position and the second use position,
   wherein the gearbox is pivotally connected to the pivot bracket and configured to pivot as the back frame pivots between the first use position and the second use position.

2. The vehicle seat of claim 1, wherein the spindle pivots towards the vehicle floor as the back frame is pivots between the first use position and the second use position.

3. The vehicle seat of claim 1, wherein the back frame includes a first side member pivotally attached to the pivot bracket.

4. The vehicle seat of claim 3, further comprising:
   a cross member, wherein the back frame includes a second side member and the cross member extends between the first side member and the second side member and at least a portion of the cross member is coaxial to the pivot axis.

5. The vehicle seat of claim 1, wherein the spindle translates from an extended position, in which the back frame is in the first use position, to a retracted position, in which the back frame is in the second use position.

6. The vehicle seat of claim 5, further comprising:
   a support bracket fixed to an end of the spindle and configured to carry the striker or the latch, wherein when the spindle is in the extended position, the support bracket is spaced apart from the gearbox by a first distance, and when the spindle is in the retracted position, the gearbox is spaced apart from the gearbox by a second distance, wherein the first distance is less than the first.

7. The vehicle seat of claim 6, further comprising:
   an attachment member, wherein the support bracket includes a supporting portion, extending substantially parallel to the vehicle floor, and a guide portion defining a slot, wherein the attachment member extend through the slot and is fixed to the pivot bracket.

8. The vehicle seat of claim 7, wherein the slot has an arcuate shape extending away from the vehicle floor with respect to the longitudinal direction.

9. A vehicle seat for use in a vehicle including a vehicle floor, the vehicle seat comprising:
   a pivot bracket;
   a back frame pivotally connected to the pivot bracket and configured to pivot about a pivot axis, wherein the back frame includes a first end spaced apart from and disposed below the pivot axis;
   a first linear adjustment mechanism; and
   a latch configured to
       selectively attach the linear adjustment mechanism to the first end of the back frame so that as the first linear adjustment mechanism translates the back frame pivots from a first use position to a second use position, and
       selectively detach the linear adjustment from the first end of the back frame so that the back frame is pivotable to a non-use position.

10. The vehicle seat of claim 9, wherein the linear adjustment mechanism includes an elongated rack, configured to be coupled to the vehicle floor and coupled to the back frame, and a pinion drive, wherein the pinion drive is provided with a pinion configured to rotate in a first rotational direction to translate the elongated rack so that the back frame pivots from the first use position to the second use position.

11. The vehicle seat of claim 10, further comprising:
    a fixed rail configured to be coupled to the vehicle floor;
    a translatable rail configured to move along the fixed rail; and
    a second linear adjustment mechanism including,
       a gearbox,
       a spindle operatively coupled with the gearbox,
       a second bracket attaching the second gearbox to either the translatable rail or the fixed rail, and
       an attachment member operatively coupled to the second gearbox and configured to carry the translatable rail along the fixed rail.

12. The vehicle seat of claim 9, wherein when the back frame is in the non-use position and when the vehicle seat is used in the vehicle, the back frame is positioned substantially parallel to the vehicle floor.

13. The vehicle seat of claim 9, wherein the back frame includes a first side member configured to pivot about the pivot bracket and wherein the first side member is substantially aligned with the first linear adjustment mechanism.

14. A vehicle seat for use in a vehicle, the vehicle seat comprising:
    a fixed rail configured to be coupled to a floor of the vehicle;
    a translatable rail configured to move along the fixed rail;
    a cushion carrier coupled to the translatable rail;
    a pivot bracket configured to be fixed to at least one of the fixed rail, the translatable rail, and the floor;
    a back frame pivotally connected to the pivot bracket and configured to pivot about a pivot axis between a first use position, a second use position, and a non-use position;
    a first linear adjustment mechanism coupled to the translatable rail; and
    a latch configured to
       selectively attach the first linear adjustment mechanism to the back frame so that as the linear adjustment mechanism translates, the back frame pivots from the first use position to the second use position, and selectively detach the first linear adjustment mechanism from the back frame so that the back frame is pivotable to the non-use position.

15. The vehicle seat of claim 14, wherein the pivot bracket is fixed to the translatable rail and the first linear adjustment mechanism includes,
   a gearbox,
   a gearbox bracket attaching the gearbox to the pivot bracket,
   a spindle extending through the gearbox,
   an attachment member extending between the spindle and the latch, wherein the gearbox is configured to translate the spindle to move the back frame between the first use position and the second use position.

16. The vehicle seat of claim 15, further comprising:
   a motor operatively connected to the gearbox;
   a motor attachment bracket fixed to the motor and defining a first slot and a second slot, wherein the gearbox bracket includes a first leg, a second leg, and a medial member extending therebetween, wherein the first slot lies along the first leg and the second slot lies along the second leg.

17. The vehicle seat of claim 15, wherein the attachment member includes a striker and the latch is configured to engage the striker to selectively attach the back frame to the spindle.

18. The vehicle seat of claim 15, wherein the pivot bracket includes a first side and a second side opposing the first side, and both the back frame and the spindle are disposed on the first side of the pivot bracket.

* * * * *